US007809604B1

(12) United States Patent
Bensoussan et al.

(10) Patent No.: US 7,809,604 B1
(45) Date of Patent: Oct. 5, 2010

(54) METHOD AND APPARATUS FOR COMPONENT PLAN ANALYSIS UNDER UNCERTAINTY

(75) Inventors: Pascal Bensoussan, Stanford, CA (US); Paul Dagum, San Francisco, CA (US); Adam Galper, San Francisco, CA (US); Michael Goldbach, Berkeley, CA (US); Balazs Kralik, Berkeley, CA (US); Vivek Vaidya, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 12/098,112

(22) Filed: Apr. 4, 2008

Related U.S. Application Data

(62) Division of application No. 09/823,846, filed on Mar. 30, 2001, now Pat. No. 7,398,221.

(51) Int. Cl.
*G06F 17/30* (2006.01)
(52) U.S. Cl. ...................................................... 705/10
(58) Field of Classification Search .................... 705/10
See application file for complete search history.

(56) References Cited

U.S. PATENT DOCUMENTS

| | | | |
|---|---|---|---|
| 5,930,762 | A | 7/1999 | Masch |
| 5,953,707 | A | 9/1999 | Huang et al. |
| 6,006,192 | A | 12/1999 | Cheng et al. |
| 6,032,121 | A | 2/2000 | Dietrich et al. |
| 6,064,984 | A | 5/2000 | Ferguson et al. |
| 6,167,405 | A | 12/2000 | Rosensteel, Jr. et al. |
| 6,453,303 | B1 | 9/2002 | Li |
| 7,398,221 | B1 | 7/2008 | Bensoussan et al. |
| 7,421,406 | B2 * | 9/2008 | Dixon et al. .............. 705/36 R |
| 2003/0074392 | A1 * | 4/2003 | Campbell et al. ........... 709/203 |

OTHER PUBLICATIONS

U.S. Appl. No. 12/061,166, filed Apr. 2, 2008, Bensoussan et al.

Applequist, G., et al., "Risk and Uncertainty in Managing Chemical Manufacturing Supply Chains," Sep. 2000 School of Chemical Engineering Purdue University, West Lafayette, IN 47909-1283, USA. pp. 1-16.

Bass, Frank M., Purdue University, "A New Product Growth for Model Consumer Durables," Management Science, vol. 15, No. 5, Jan. 1969, pp. 216-227.

(Continued)

*Primary Examiner*—Romain Jeanty
(74) *Attorney, Agent, or Firm*—Perkins Coie LLP

(57) ABSTRACT

A representative implementation of a method begins when a planner captures assumptions about products and components in an entity called a "scenario." A scenario is the parameterization of all the demand, financial, and operational information for a portfolio of products and components across a set of time buckets (planning periods). The planner then specifies a component plan to be analyzed, which identifies the quantities of each resource that will be used or procured during each planning period. A request for analysis includes one or more analysis parameters that will be used in order to evaluate the performance and the risks associated with the component plan and scenario. The request for analysis is submitted to an analysis engine for calculation of risk indicators. The analytical engine calculates all the performance indicators and returns the results. The results are then typically stored in a database or other persistent storage system.

15 Claims, 6 Drawing Sheets

OTHER PUBLICATIONS

Dagum, Camilo, Econometric Research Program Princeton University, "Structural Permanence: Its Role in the Analysis of Structural Dualisms and Dependencies and for Prediction and Decision Purposes," The Economics of Structural Change vol. 1, The International Library of Critical Writings in Economics, An Elgar Reference Collection, 1969, pp. 211-235.

Hanssens, Dominque et al., "Econometric and Time-Series Market Response Models," Chapter 9, Handbooks in OR & MS, vol. 5, J. Eliashberg and G.L. Lilien, Eds., 1993, pp. 409-464.

Mahajan, Vijay et al., "New-Product Diffusion Models," Chapter 8, Handbooks in OR & MS, vol. 5, J. Eliashberg and G. L. Lilien, Eds., 1993, pp. 349-408.

Zhang, P., "Design and Evaluation of a Business Information Visualization System for Manufacturing Production Planning Support," Proceedings of INFORMS First Conference on Information Systems and Technology, May 1996, 8 pgs.

Ingalls, Ricki G. and Cynthia Kasales, "CSCAT: The Compaq Supply Chain Analysis Tool," Proceedings of the 1999 Winter Simulation Conference, Dec. 1999, pp. 1201-1206.

Wu, Lilian Shiao-Yen et al., "Business planning under uncertainty—Will we attain our goal?," International Journal of Forecasting, vol. 8, 1992, pp. 545-557, © 1992 Elsevier Science Publishers B.V.

* cited by examiner

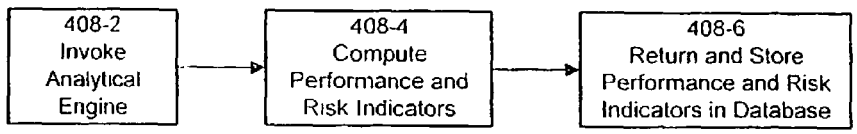
Fig. 9
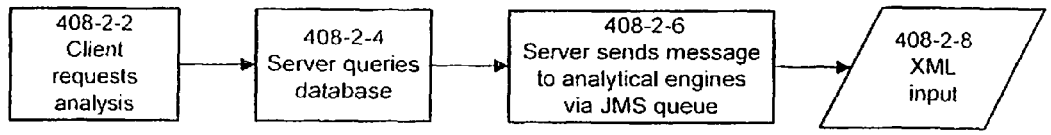
Fig. 10
Fig. 11
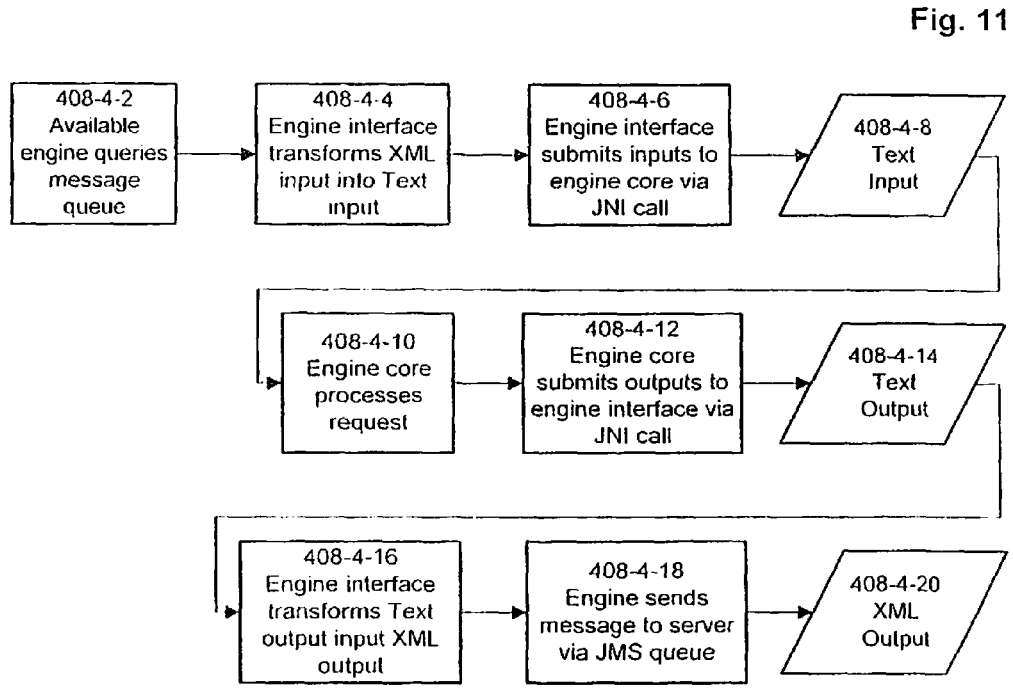
Fig. 12
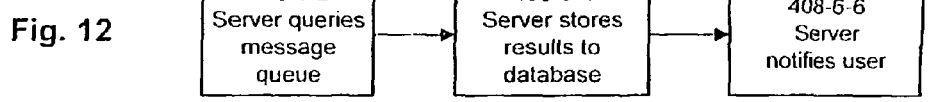

METHOD AND APPARATUS FOR COMPONENT PLAN ANALYSIS UNDER UNCERTAINTY

RELATED APPLICATIONS

This application is a divisional of U.S. patent application Ser. No. 09/823,846, entitled "Method and Apparatus for Component Plan Analysis Under Uncertainty," filed Mar. 30, 2001, now U.S. Pat. No. 7,398,221, issued Jul. 8, 2008, and naming Pascal Bensoussan, Paul Dagum, Adam Galper, Michael Goldbach, Balazs Kralik and Vivek Vaidya as inventors. This application is incorporated by reference herein, in its entirety and for all purposes.

TECHNICAL FIELD OF THE INVENTION

The present invention is generally related to resource-planning methods used by manufacturing companies and other organizations. More specifically, the present invention includes a method for strategic resource planning that accounts for uncertainties inherent in the forecasting process.

BACKGROUND OF THE INVENTION

Strategic resource planning is an essential tool for many companies and organizations. Strategic resource planning allows companies to acquire the resources that they need in the amounts that they need, when they are needed. These resources can include goods, raw materials, services, manpower, facilities and a wide range of other things.

The value of strategic resource planning depends entirely on its accuracy. Inaccurate forecasting is, in many cases, worse than no forecasting at all. As a result, a great deal of energy has been invested in creating accurate methods for forecasting. Unfortunately, forecasts will always be imperfect. Therefore, the planner will always be faced with the financial risks associated with over- and under-supply. The real business challenge is to effectively manage the risks of planning under uncertainty.

Risk management requires explicit consideration of multiple possible outcomes and their likelihood (or probability) of occurring. In this case, multiple possible outcomes arise because the demand forecast is not clairvoyant. The probability that any particular outcome will occur is related to the uncertainty around the demand forecast. Existing systems do not treat the uncertainty of demand forecasts explicitly. Instead of explicitly quantifying these uncertainties, existing systems merely assume that demand forecasts may be inaccurate. As a result, the degree of uncertainty is never elicited for use in a formal analysis. When the underlying demand data is not represented probabilistically, risk management methods are difficult if not impossible.

Resource planning for resources consumed in the assembly (creation or manufacture) or refinements (from which value is derived) is a particular complex task as demand for resources is actually driven by demand for the refinements. Moreover, while costs are associated with positioning resources, it is ultimately the availability of refinements that provides revenue.

Demands for finished goods often have relationships that can be described as neutral, cannibalistic or synergistic. Goods that have synergistic relations tend to boost each other's sales. This happens when the products tend to be used together, such as a computer system and monitor. Goods that have cannibalistic relations compete for sales. This happens when one good is used in place of the other, such as a computer system and a slightly faster computer system. Unfortunately, existing systems and methods for strategic resource planning do not capture explicitly or use the demand relations among finished goods. As a result, these systems tend to produce sub-optimal results.

Existing systems do not explicitly capture time based resource availability in the form of contractual terms that provide supply flexibility around a specific resource plan. Very often planned quantities of resources for refinement can be canceled (at costs), or additional quantities can be expedited (at costs) as a reaction to real demand.

Existing systems calculate resource demands from refinement demands and may provide a measure of refinement availability from resource availability (given resource allocation rules). However, existing systems assume demand information to be deterministic (single forecast estimate). Existing systems are not able to connect demands for refinements and implied demands for resources, as well as availability of resources and implied availability of refinements.

Finally, existing systems do not have the ability to provide performance measures on cost exposure, revenue, profit and availability risks at both refinement and resource levels that account for the uncertainty and demand dynamics for refinements competing for scarce resources.

SUMMARY OF THE INVENTION

An embodiment of the present invention includes a method and apparatus for component plan analysis under uncertainty. During the first step of this method, assumptions about products and components are captured in an entity called a "scenario." A scenario is the parameterization of all the demand, financial, and operational information for a portfolio of products and components across a set of time buckets (planning periods).

The second step of the method is to specify the component plan that will be analyzed. The component plan identifies the quantities of each resource that will be positioned during each planning period.

The third step of the method is to generate a request for analysis. The request for analysis specifies parameters that will be used in order to evaluate the performance and the risks associated with a selected component plan (see step two) under a specific scenario (see step one). The parameters specify such things as, for example, whether the component plan is a commitment to use or procure the resources, or whether the acquisition of resources can be responsive to demand fluctuations within flexibility ranges defined by contractual terms.

The fourth step of the method is to calculate risk indicators. During this step, an analytical engine processes the request for analysis. The analytical engine calculates all the performance indicators and returns the results. These results are then stored in a database or other persistent storage system.

The fifth step of the method is to display the results of the calculations to the user.

BRIEF DESCRIPTION OF THE DRAWINGS

For a more complete understanding of the present invention and for further features and advantages, reference is now made to the following description taken in conjunction with the accompanying drawings, in which:

FIG. 9 is a flowchart showing the sub-steps associated with the step of calculating and storing risk factors of FIG. 4.

FIG. 10 is a flowchart showing the sub-steps associated with the analytic engine invocation step of FIG. 9.

FIG. 11 is a flowchart showing the sub-steps associated with the step of computing performance and risk indicators of FIG. 9.

FIG. 12 is a flowchart showing the sub-steps associated with the step of returning and storing performance and risk indicators of FIG. 9.

DETAILED DESCRIPTION OF THE PREFERRED EMBODIMENTS

The preferred embodiments of the present invention and their advantages are best understood by referring to FIGS. 1 through 4 of the drawings. Like numerals are used for like and corresponding parts of the various drawings.

DEFINITIONS

Component: in this document, the resources required to produce products are referred to as components. It should be noted that components may be sold directly as products in some cases.

Product: goods or other refinements of components are described as products.

Position: positioning is an alternative to ordering components. When a company (of other entity) positions a component, it has arranged for it to be available without actually putting the component in inventory. Thus, as an example, a supplier may agree to provide a certain quantity of a component during a time frame. The component is positioned in that quantity for that time frame.

Component plan: a list of quantities for each component, representing a company's component position for a given planning period.

Scenario: a set of assumptions about products and components. A scenario includes at least product parameters, component parameters, and component consumptions.

Environment

Figure 1:
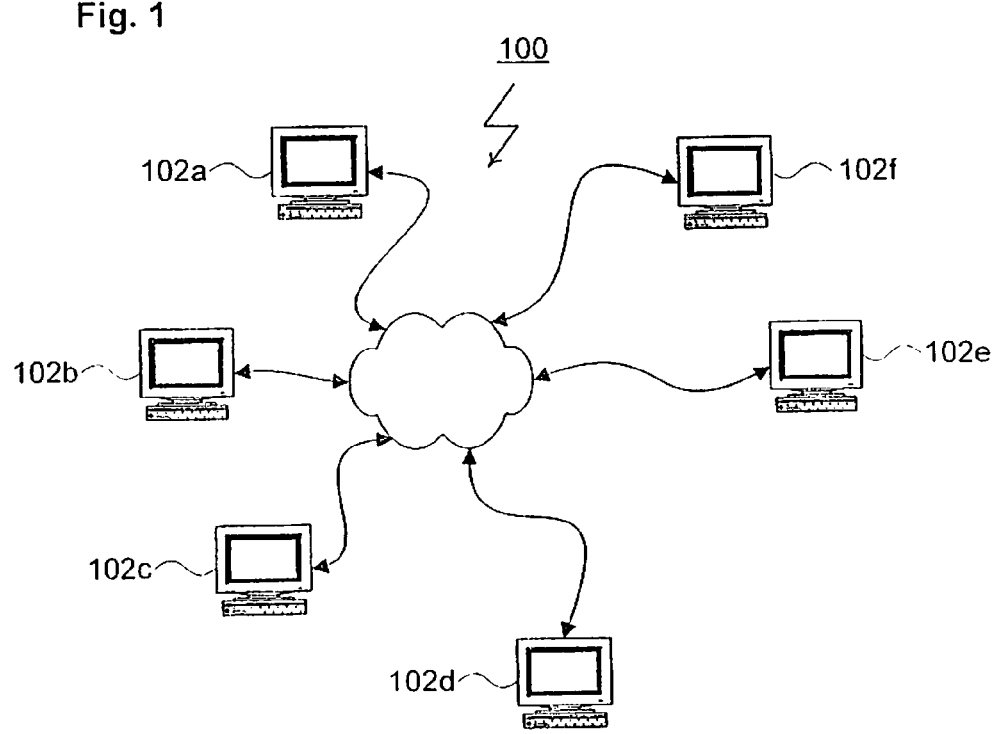
FIG. 1 is a block diagram of an Internet-like network shown as a representative environment for deployment of the present invention.

In FIG. 1, a computer network 100 is shown as a representative environment for an embodiment of the present invention. Computer network 100 is intended to be representative of the complete spectrum of computer network types including Internet and Internet-like networks. Computer network 100 includes a number of computer systems, of which computer system 102a through 102f are representative. Computer systems 102 are intended to be representative of the wide range of large and small computer and computer-like devices that are used in computer networks of all types. Computer systems 102 are specifically intended to include non-traditional computing devices such as personal digital assistants and web-enabled cellular telephones.

Figure 2:
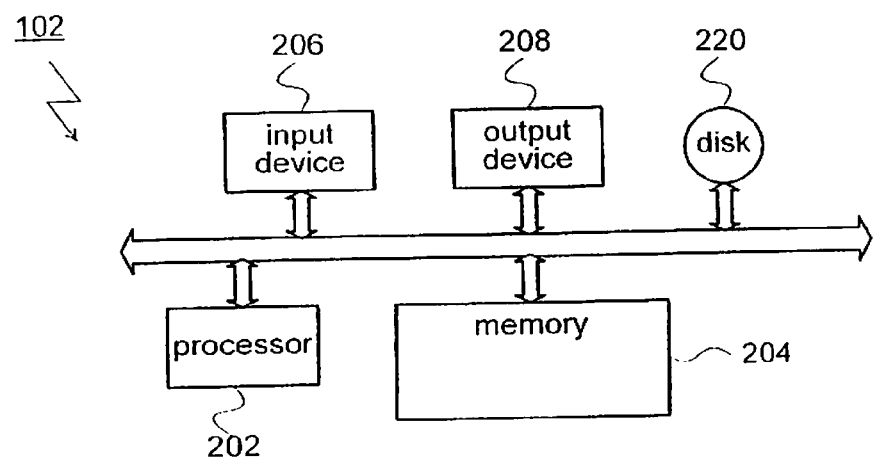
FIG. 2 is a block diagram of a computer system as used within the network of FIG. 1.
Figure 3:
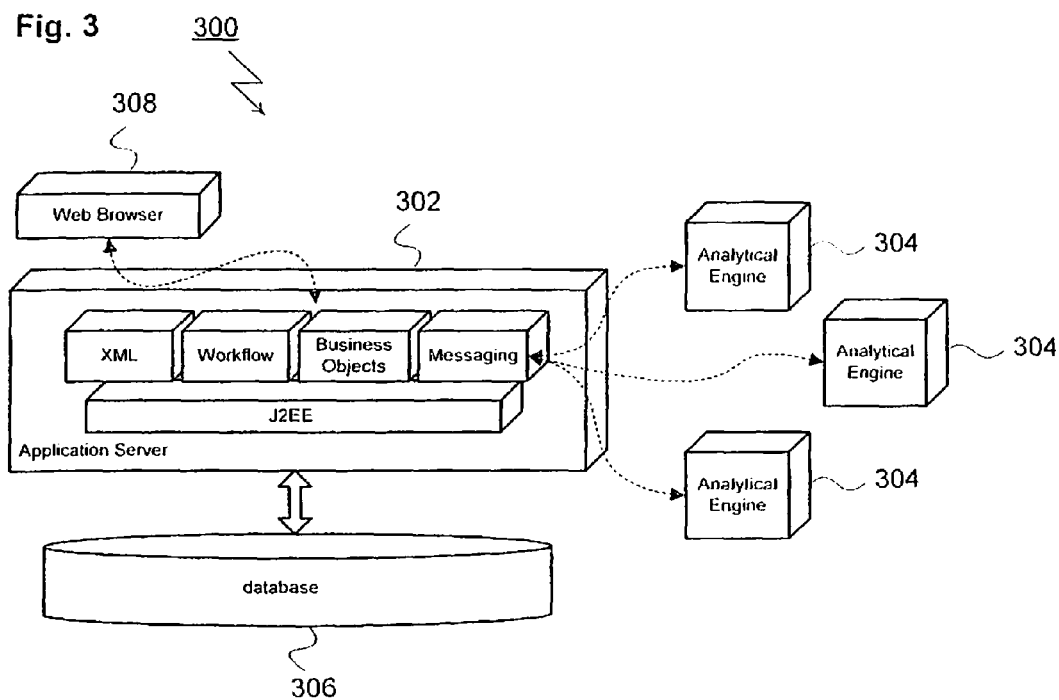
FIG. 3 is a block diagram of an analysis system as used by an embodiment of the present invention.

FIG. 2 shows a representative implementation for computer systems 102. Structurally, each computer system 102 includes a processor, or processors 200, and a memory 202. Processor 200 can be selected from a wide range of commercially available or custom types. An input device 204 and an output device 206 are connected to processor 200 and memory 202. Input device 204 and output device 206 represent all types of I/O devices such as disk drives, keyboards, modems, network adapters, printers and displays. Each computer system 102 may also includes a disk drive 210 of any suitable disk drive type (equivalently, disk drive 210 may be any non-volatile mass storage system such as "flash" memory).

Software Architecture

For the purposes of description, it may be assumed that computer network 100 includes an analysis system hosted by one or more computer systems 102. A representative implementation for a system of this type is shown as analysis system 300 of FIG. 3. Analysis system 300 includes an analytic application server ("server") 302 that coordinates multiple, distributed analytic engines ("engines") 304.

Server 302 interacts with a database 306 and any number of web browsers 308. Server 302 manages web interactions, database access, XML-based data exchange, report design and delivery, and asynchronous messaging among engines. The server can be based, for example, on Java 2 Enterprise Edition (J2EE) standards.

Analytic engines 304 are stateless components offering a set of related analytics. Clients submit problem statements to analytic engines 304. For the particular implementation being described, clients submit problem statements as XML documents. For other implementations, other encodings and protocols may be used. Each problem statement identifies an analysis to perform and includes all necessary input data. Analytic engines 304 output a solution as XML documents. Once again, the use of XML is implementation dependent—other implementations may use other encodings and protocols. Each analytic engine 304 must define the structure/schema of its expected input and output.

Each engine 304 includes an engine interface and an engine core. The engine interface handles XML-based I/O, message queue management, and provides standards-based APIs. The engine core processes the analytic requests for a set of related problems. For the particular implementation being described, engine interfaces are implemented as Java applications and engine cores implemented as compiled libraries of Matlab source code. Each engine interface can communicate with its corresponding engine core through, for example, Java Native Interface (JNI) calls in which input and output filenames are passed.

Overview of Method and Apparatus for Component Plan Analysis Under Uncertainty

Figure 4:
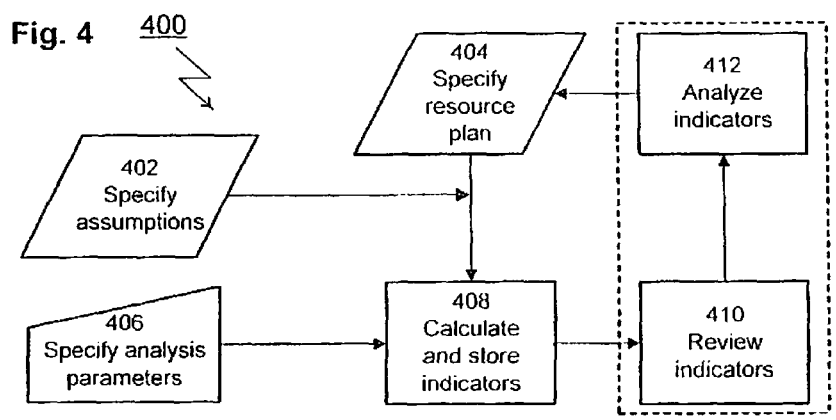
FIG. 4 is a flowchart showing the steps associated with an embodiment of the risk analysis method of the present invention.

An embodiment of the present invention includes a method and apparatus for component plan analysis under uncertainty. A representative implementation of this embodiment is shown in FIG. 4 as Method 400. In this particular implementation of this embodiment, the term "product" will be used for "refinement" and the term "component" will be used for "resource". Method 400 begins with step 402 where a planner captures assumptions about products and components in an entity called a "scenario." A scenario is the parameterization of all the demand, financial, and operational information for a portfolio of products and components across a set of time "buckets" (planning periods). The data input process can be either manual (through a user interface) or automated (e.g., by importing data from external systems).

After completing step 402, Method 400 continues with step 404. In step 404, the planner specifies a component plan to be analyzed. The component plan identifies the quantities of each resource that will be used or procured during each planning period.

In step 406, the planner generates a request for analysis. The request for analysis specifies the parameters that will be used in order to evaluate the performance and the risks associated with the component plan of step 404 and the scenario of step 402.

In step 408, the request for analysis is submitted to an analysis engine for calculation of risk indicators. The analytical engine calculates all the performance indicators and returns the results. The results are then typically stored in a database or other persistent storage system.

Assumption Specification

Figure 5:
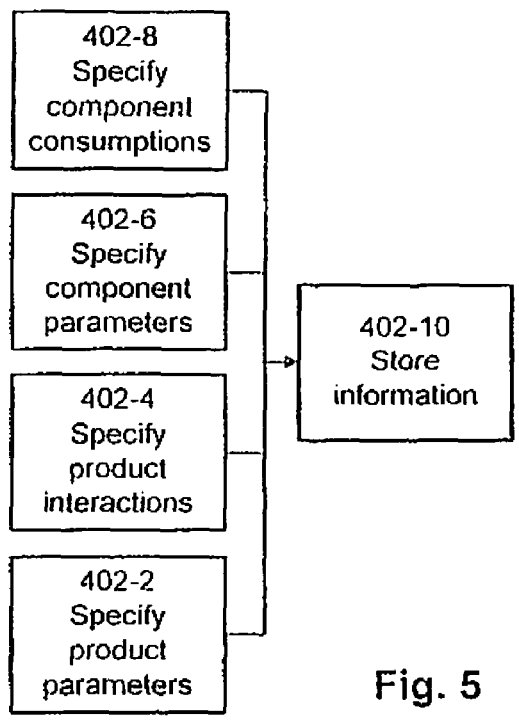
FIG. 5 is a flowchart showing the sub-steps associated with the assumption specification step of FIG. 4.

The process of assumption specification (step 402 of FIG. 4) can be further subdivided into the series of steps shown in FIG. 5. In the first of these steps, step 402-2, the user of the system specifies assumptions about product parameters. These parameters describe the products that are to be produced and can be manually input or loaded from external systems. Typical product parameters include demand parameters, financial parameters, and demand support parameters.

Demand parameters characterize the demand forecast for products on a period-by-period basis. This demand is characterized in a probabilistic sense. In the preferred embodiment of this invention, demand is characterized by the mean forecast and standard deviation of the demand for each product for each period.

Financial parameters characterize the financial aspects of each product. This is done on a period-by-period basis and typically includes the revenue/income that is gained from satisfying the product demand (i.e. product selling price) and the cost of refining the product (i.e. including the standard costs of consumed components).

Demand support parameters characterize product availability targets, on a period-by-period basis. Under assemble-to-order (ATO) production with shared components, production is probabilistic because the actual number of units produced will depend on demand for all products that share components. Therefore demand support parameters are typically expressed in terms of:

Product target support level—This parameter defines the number of units of a product that can be produced at a specified level of confidence (e.g., 800 widgets may be produced with a confidence of 85%); and Product target level support confidence—This parameter defines the probability that a given plan can meet a given product target support level (e.g., there is a confidence of 85% that 800 widgets may be produced).

In step 402-4 of FIG. 5 the planner specifies product interactions. Product interactions describe the relationship (neutral, cannibalistic or synergistic) between different products. Thus, if sales of one product encourage sales of a second, a positive correlation coefficient is used to describe the relationship between the first and second products. Zero or negative correlation coefficients are used to describe neutral or cannibalistic relationships between products. Product interactions are described on a period-by-period basis.

In step 402-6 of FIG. 5 the planner specifies component parameters. Component parameters characterize the components that are required for the products that are to be produced. These parameters typically include component supply parameters and component financial parameters. Component supply parameters characterize the planned replenishment of components on a period-by-period basis. Generally, this characterization includes the component availability constraints for each required component (e.g., the minimum and maximum supply quantities for each component). Component supply parameters also typically specify the lead-time for each component on a period-by-period basis. The lead-time for a component is the time delay between ordering the component and having the component available for manufacturing or resale.

Component supply parameters may also include parameters that describe the contractual basis under which each component is obtained. These parameters are typically expressed in terms of:

cancellation maximums—The maximum quantity of a component plan that can be returned to a supplier (with or without cancellation fees).

cancellation threshold—The maximum quantity of a component plan that can be returned to a supplier for a full refund.

expedite threshold—The maximum quantity of a component that a supplier will provide, beyond the quantity initially planned, without imposing expediting fees.

expedite maximum—The maximum quantity of a component that can be obtained (with or without expediting fees).

The component financial parameters specified by the planner characterize the costs associated with each component. Typically, these parameters include: the procurement cost of the component (i.e. standard cost), the cost of canceling part of the component plan below the cancellation threshold and the cost of procuring additional components above the expedite threshold.

In step 402-8 of FIG. 5 the planner specifies component consumption often associated with the product bill-of-materials (BOM). In this step, the consumption relationship between each product and all of its consumed components is specified on a period-by-period basis. This describes, in particular, how many of each component is required to produce each product.

In step 402-10 of FIG. 5 the information generated in steps 402-2 through 402-8 is stored in a persistent way for later use. Typically, this is done by storing the information in database tables. Other forms of persistent storage can also be used.

Component Plan Specification

Figure 6:
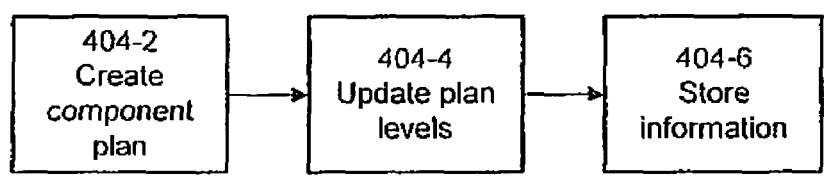
FIG. 6 is a flowchart showing the sub-steps associated with the component plan specification step of FIG. 4.

The process of component plan specification (step 404 of FIG. 4) can be further subdivided into the series of steps shown in FIG. 6.

In step 404-2 of FIG. 6 the planner creates a component plan. The component plan contains the intended procurement quantities for each component for each planning period. Component plan quantities are measured in the standard units of measure for the components. For example, electronic components are measured in units, and assembly capacity is measured in hours. The component plan can be created in a number of different ways:

One method is to create the component plan using a default plan loaded from the database or other persistent storage (either from the database 306 or from external systems).

Another method is to copy an existing component plan. This method is particularly useful where a similar plan is already in existence, such as is the case where a manufacturing process is being revised or optimized or if the user would like to compare the performance of a component plan with a modified copy of the plan under the same scenario.

Still another method is to generate an optimal component plan from a specified scenario (such as the scenario defined in step 402). For this type of plan creation method, the specified scenario is evaluated to create component plans that satisfy certain objectives, e.g. maximize total profit or total revenue or minimize total costs (with or without budget, component supply, or product service level constraints).

In step 404-4 of FIG. 6 the planner updates the levels included in the component plan. This can be done manually from a user interface. In other cases, updated levels are obtained automatically. Automatic updates can be obtained from external systems (such as ERP, SCM, or Planning Systems) or by optimizing scenarios for profit, cost, budget or revenue. Automatic updates can also be obtained by overwriting with plan levels from another plan. Enterprise Resources Planning (ERP) systems are used to capture data and manage data entry to support both the manufacturing and accounting operations. Supply Chain Management (SCM) applications are used to manage information across supply chains around product data management (PDM), supplier relationship management, master production schedules (MPS), and replenishments.

In step 404-6 of FIG. 6 the information generated in steps 402-2 through 402-8 is stored in a persistent way for later use. Typically, this is done by storing the information in database tables. Other forms of persistent storage can also be used.

Figure 7:
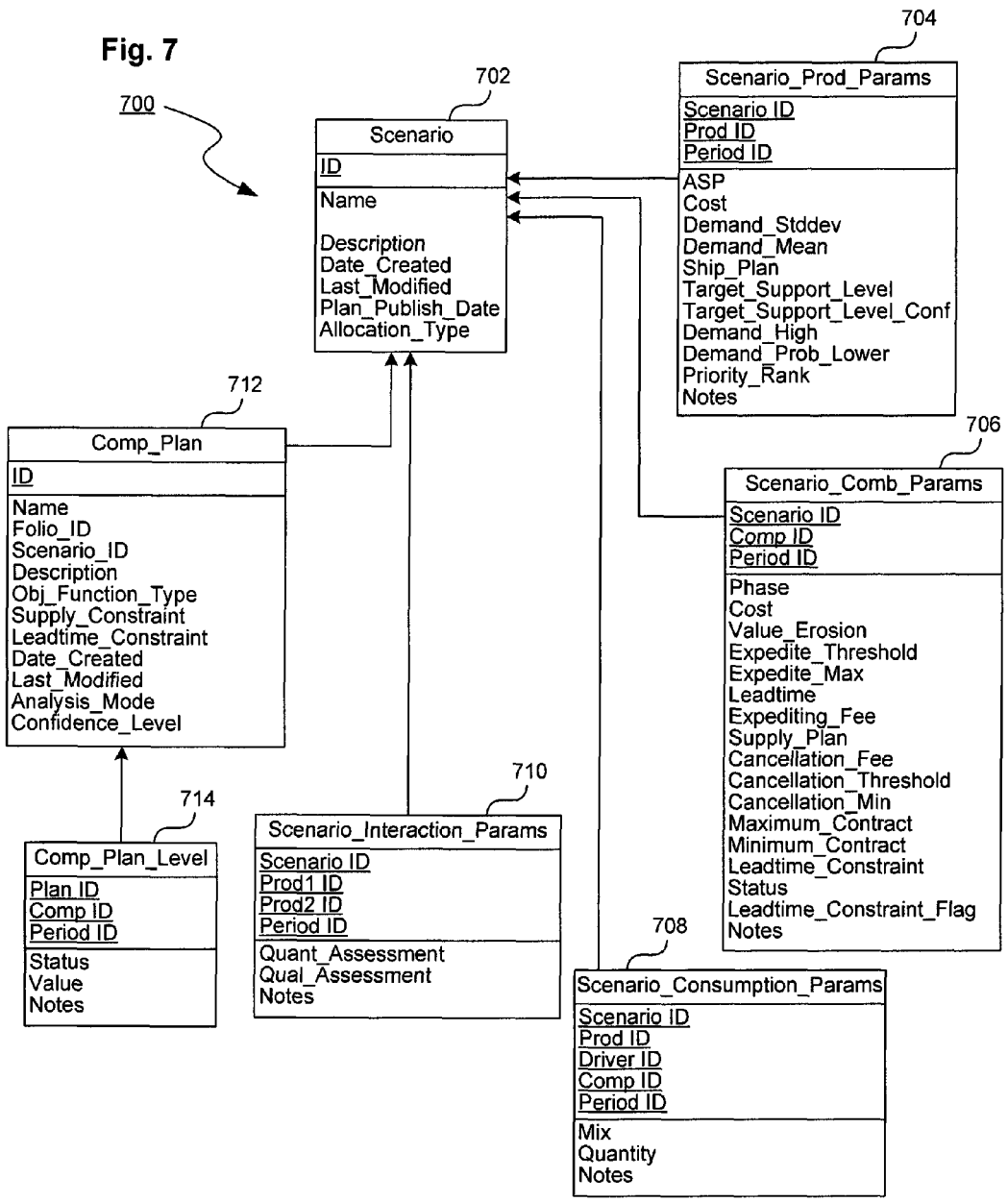
FIG. 7 is a block diagram showing a representative set of database tables used to store the plan and scenario generated during the method shown in FIG. 4.

FIG. 7 shows a representative set of database tables that may be used for this purpose.

Table 702 contains information about a scenario document (name, description, date of creation, date of last modification, and other parameters that may be used by the system).

Table 704 contains all product parameters listed above for a given product under a given scenario in a given planning period.

Table 706 contains all component parameters listed above for a given component under a given scenario in a given planning period.

Table 708 contains all consumption information between a product and a given component (typically called a Bill of Materials, or BOM, in manufacturing environments), under a given scenario in a given planning period.

Table 710 contains product demand interactions for two products under a given scenario in a given planning period.

Table 712 contains information about a component plan document (name, description, date of creation, date of last modification, and other parameters that may be used by the system).

Table 714 contains plan information (quantity, and other parameters that can be used by the system) for a given component, in a given plan document in a given planning period.

Analysis Generation

Figure 8:
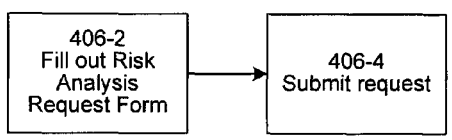
FIG. 8 is a flowchart showing the sub-steps associated with the analysis request generation step of FIG. 4.

The process of generating an analysis (step 406 of FIG. 4) can be further subdivided into the series of steps shown in FIG. 8. In the first of these steps, step 406-2, the planner fills out a request for analysis form. The planner creates a request for analysis form in order to evaluate the performance and the risks associated with a selected plan under a specific scenario. For the particular implementation being described, the request for analysis form includes a combination of the following fields:

Name: The name provides a method for referring to the analysis. For most implementations, this field is required.

Description: This field allows the planner to enter additional text or notes to accompany the analysis. This field is typically optional.

Scenario: The planner is required to select a scenario from a list of existing scenarios.

Plan: The planner is required to select a plan from a list of existing plans.

Mode: This field allows the planner to choose between Commit and Respond modes of analysis, where Commit and Respond modes are defined as follows:

Commit means that the analysis is to be performed using the assumption that planner is committed to purchasing the components as planned and cannot take advantage of expediting or cancellation options in the future when actual demand will be known. In commit mode, the analysis will not include these component parameters in its calculations. This is the default selection.

Respond means that the analysis is to be performed using the assumption that expediting or cancellation options can be used.

Confidence Level %: This field allows the planner to choose between using a default confidence level and specifying a global confidence level as follows:

To enter a global confidence level, the planner enters a numerical percentage in the confidence level field. The analysis then applies this value for all products.

To use a default confidence level, the planner selects (or doesn't modify) the default selection in the confidence level field. The analysis then applies the confidence levels specified in the product parameters of the selected scenario.

Status Notification: The planner uses this field to identify an address to use for email notification. Email is sent to this address when the risk analysis is complete.

In step 406-4 of FIG. 8 the planner submits the request for analysis generated in the previous step. Typically, this is done by pressing a submit button or other user interface icon. In some cases, default value may be supplied for the required inputs of step 406-2. This allows the user to skip step 406-2 and proceed directly to step 406-4. This provides a single step (one-click) method for default values.

Calculation of Risk Indicators

In step 408, the request for analysis is submitted to an analysis engine for calculation of risk indicators. This process can be further subdivided into the series of steps shown in FIG. 9. In the first of these steps, step 408-2, server 302 invokes one of analytic engines 304. In step 408-4, the selected analytic engine 304 performs a risk analysis with the specified parameters. In step 408-6, the results of this analysis are returned to server 302 and stored in database 306.

Step 408-2 can be further subdivided into the series of steps shown in FIG. 10. In the first of these steps, step 408-2-2, the client requests that the analysis be performed. As discussed, this request takes the form of a specified plan, specified scenario and specified analysis parameters.

In step 408-2-4, server 302 queries database 306 to retrieve the specified plan and specified scenario. In step 408-2-6, server 302 encodes the retrieved plan and scenario, along with the specified analysis parameters as an XML message. Server 302 sends the XML message to analytic engines 304 using, for example, a JMS (Java Message Service) queue. In step 408-2-8, the XML message is shown as XML input for one of analytic engines 304. A representative example of a DTD (Document Type Definition) specifying the format of an XML message of this type is attached to this document as Appendix A.

Step 408-4 can be further subdivided into the series of steps shown in FIG. 11. In the first of these steps, step 408-4-2, one of analytic engines 304 queries the JMS queue where the XML message is queued. In general, analytic engines 304 query the JMS queue when they become idle and are available to perform work. Step 408-4-2 corresponds to the case where one of analytic engines 304 has become idle and is performing this query. The available analytic engine 304 retrieves the XML message generated by server 302 as part of this query.

Each analytical engine 304 is subdivided into an engine interface and an engine core. The engine core is designed to accept analysis requests from the engine interface. The engine interface is designed to map a particular language (in this case XML) to input understood by the engine core. This provides clean separation between the engine core and the server 302 allowing flexibility to define multiple interfaces to the engine core so that analytical engines 304 can with a range of different input languages.

In step 408-4-4, the engine interface of the selected analytic engine 304 validates the XML message generated by server 302 to ensure that the XML message does not include errors. The engine interface then translates the XML message generated by server 302 into a text input for the engine core.

In step 408-4-6, the engine interface of the selected analytic engine 304 sends the translated XML message to its engine core. For the described implementation, this is done using a JNI call. For other implementations, other message technologies may be used.

In step 408-4-8, the translated XML message is shown as a text input for the engine core of the selected analytical engine 304.

In step 408-4-10, the engine core processes the analysis request included in the text input. The engine core performs the calculations of the performance and risk indicators. Any analytical method could be used to generate the risk metrics. For example, methods for computing expected erosion, cancellation and expediting fees are disclosed in a co-pending U.S. Provisional Application Ser. No. 60/229,611 entitled "Method and Business Process for Estimation of Erosion Costs in Assemble-to-Order Manufacturing Operations." A method for computing component gating risk is disclosed in a co-pending U.S. Provisional Application Ser. No. 60/229,840 entitled "Method and Business Process for Estimation of Component Gating and Shortage Risks in Assemble-to-Order Manufacturing Operations." The disclosure of both of these documents is incorporated herein by reference.

The engine core produces its results as text output. In step 408-4-12, the engine core sends its output to the engine interface. For the particular implementation being described, the engine output is text. It should be appreciated, however, that different encodings and protocols could be used to perform this step. For the described implementation, the engine performs the output step by making a JNI call. For other implementations, other messaging technologies may be used.

In step 408-4-14, the text output is shown as input for the engine interface of the selected analytical engine 304.

In step 408-4-16, the engine interface of the selected analytic engine 304 translates the text output of the engine core into a second XML message. The second XML message encodes the results computed by the engine core. In step 408-4-18, the engine interface sends the second XML message back to server 302. The engine interface sends the second XML message to server 302 using the JMS queue. In step 408-2-8, the second XML message is shown as XML input for server 302. A representative example of a DTD specifying the format of an XML message of this type is attached to this document as Appendix B.

Step 408-6 can be further subdivided into the series of steps shown in FIG. 12. In the first of these steps, step 408-6-2, server 302 queries the JMS queue where the second XML message is queued. Server 302 retrieves the second XML message as part of this query.

Figure 13:
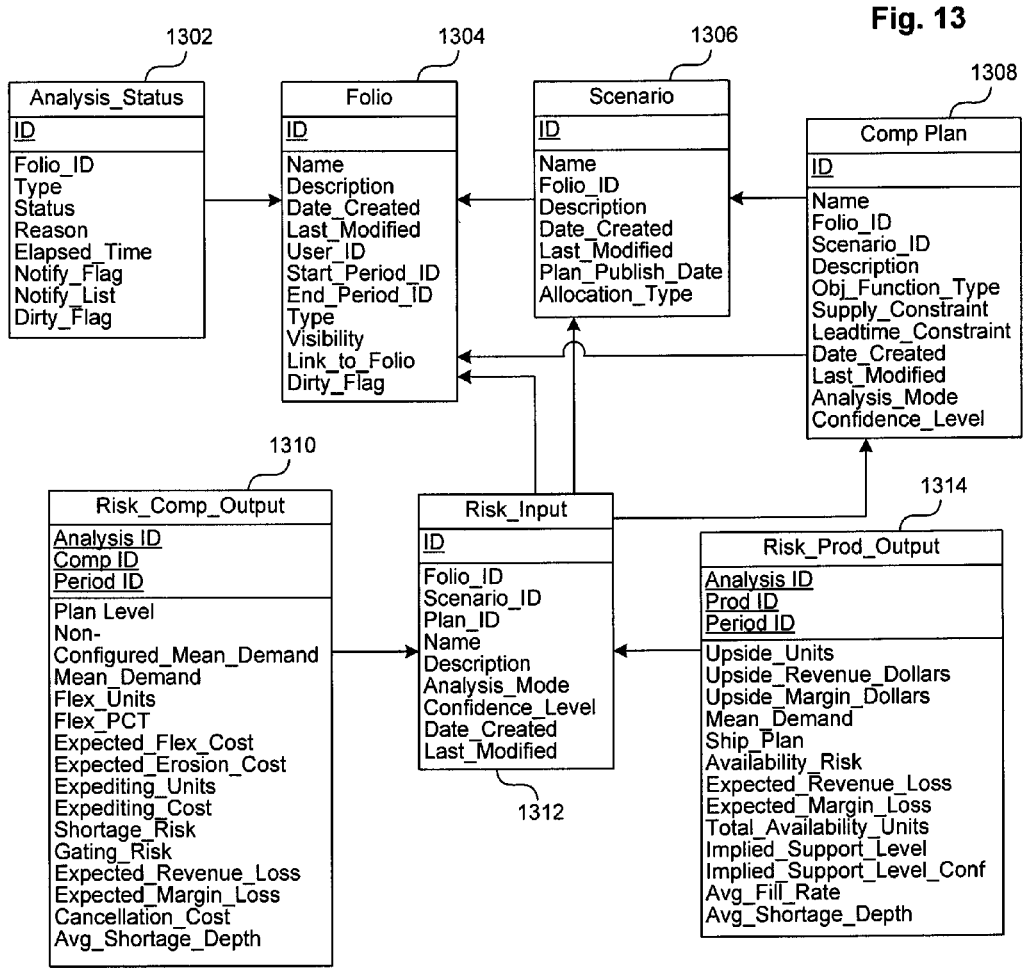
FIG. 13 is a block diagram showing a representative set of database tables used to store the storing performance and risk indicators generated during the method shown in FIG. 4.

In step 408-6-4, server 302 stores the results of the computations performed by the selected analytic engine 304 in database 306. Typically, this information is stored as database tables. Other forms of persistent storage can also be used. FIG. 13 shows a representative set of database tables that may be used for this purpose. The analytic results are saved in database 306 for subsequent reporting and navigation.

Table 1302 contains all the information about the analysis (folder where it is placed, status indicating if it was completed successfully or if it failed, process time for the computation, and other parameters that may be used by the system).

Table 1304 contains all the information about the folder used to support the resource planning process (name, creation date, beginning and ending planning periods, and other parameters that may be used by the system).

Table 1306 contains all the information about the scenario (same as 702).

Table 1308 contains all the information about the component plan (same as 712).

Table 1310 contains all the information referencing the input parameters to the analysis (scenario specified in step 402, component plan specified in step 404, and analysis parameters specified in step 406).

Table 1312 contains all the risk and performance indicators calculated by the analysis for each component and for each planning period.

Table 1314 contains all the risk and performance indicators calculated by the analysis for each product and for each planning period.

Error Handling

There are several kinds of errors that engine 304 may return:
Parsing errors: The input data is improperly formatted,
Validation errors: The input data does not pass data validation checks (i.e. data out of range or inconsistent),
Analytic errors: Engine 394 experienced an internal failure.

All errors are packaged as XML documents for return to server 302.

Risk Analysis Navigation

In many cases, it is desirable to include a risk analysis environment as part of the present invention. The risk analysis environment is a user interface for navigating the performance and risk indicators stored in database 306. This allows the planner to navigate and analyze performance and risk indicators and to make modifications to the corresponding plans and scenarios. The risk analysis environment is preferably implemented to address the following three requirements:
Ability to provide both product and component risk summary views and product-to-components and component-to-products detailed views,
Ability to navigate logically between views with the simple click of a mouse,
Ability for users to configure their own sets of views.

Figure 14:
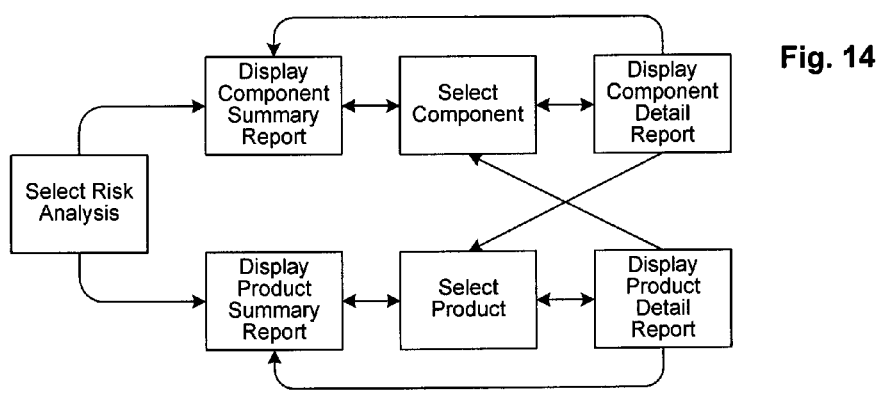
FIG. 14 is a block diagram showing use of the risk analysis environment provided by an embodiment of the present invention.

To address these requirements, the risk analysis environment includes a series of data presentation screens. For typical implementations, these include a product summary screen, a component summary screen, a component detail screen, and a product detail screen. Use of these screens is shown in FIG. 14. As shown, use of the risk analysis environment typically begins with the planner selecting a particular risk analysis to analyze. Once that selection is complete, the planner can select to continue the analysis at either the component or product level. Each level allows the user to select a particular component or product (respectively). The planner can then continue at the summary or detail level for the selected component or product. The process can be repeated for different products, components or risk analyses.

Planners use the risk analysis environment to adjust plans and scenarios to specific objectives such as product support and revenue targets, inventory cost containment, and revenue loss risk minimization. The risk analysis method of FIGS. 4 through 13 can then be re-executed and the results analyzed within the risk analysis environment.

The risk analysis environment is customizable, allowing users to select aspects (input and output parameters) of components and products and include these aspects in user-defined views. These user-defined views would then be linked to extend the navigation example of FIG. 14.

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

APPENDIX A

```
<?xml encoding="UTF-8"?>
<!-- $Id: //depot/R2.5/xml/RaptAnalysis.dtd#1 $-->
<!ELEMENT RaptAnalysis (Action, (Input|Output))>
<!ELEMENT Action EMPTY>
<!ATTLIST Action
    name (OptimalPlan |RiskAnalysis
    |GraphSensitivity|TornadoSensitivity|ComponentConsumption
    |GatedProductsAnalysis
    |GatingComponentsAnalysis|UnknownAction) #REQUIRED>
<!ELEMENT Input (ProductParameters+, CalculationParameters?,
    ComponentParameters+, Consumption+, ProductInterations*,
    SensitivityBaseInfo?, (SensitivityGraphInfo?|SensitivityTornadoInfo*),
    (FocalComponentParameters?|FocalProductParameters?))>
<!ELEMENT ProductParameters EMPTY>
<!ATTLIST ProductParameters
    product_id CDATA #IMPLIED
    period_id CDATA #IMPLIED
    product_name CDATA #IMPLIED
    cost CDATA #REQUIRED
    asp CDATA #REQUIRED
    demand_std_dev CDATA #REQUIRED
    ship_plan CDATA #REQUIRED
    demand_mean CDATA #REQUIRED
    target_support_level CDATA #REQUIRED
    target_support_level_conf CDATA #REQULRED
    demand_high CDATA #IMPLIED
    demand_prob_lower CDATA #IMPLIED>
<!ELEMENT FocalProductParameters EMPTY>
<!ATTLIST FocalProductParameters
    product_id CDATA #IMPLIED
    period_id CDATA #IMPLIED
    product_name CDATA #IMPLIED>
<!ELEMENT ComponentParameters EMPTY>
<!ATTLIST ComponentParameters
    component_id CDATA #IMPLIED
    period_id CDATA #IMPLIED
    component_name CDATA #IMPLIED
    value_erosion CDATA #IMPLIED
    supply_plan CDATA #IMPLIED
```

APPENDIX A-continued

```
    cancellation_threshold CDATA #IMPLIED
    cancellation_fee CDATA #IMPLIED
    cancellation_minimum CDATA #IMPLIED
    lead_time CDATA #IMPLIED
    expediting_fee CDATA #IMPLIED
    phase CDATA #IMPLIED
    cost CDATA #IMPLIED
    maximum_contract CDATA #IMPLIED
    minimum_contract CDATA #IMPLIED
    expedite_threshold CDATA #IMPLIED
    expedite_maximum CDATA #IMPLLED
    leadtime_constraint CDATA #IMPLIED
    leadtime_constraint_flag CDATA #IMPLIED
    status CDATA #IMPLIED
    plan_level CDATA #IMPLIED>
<!ELEMENT FocalComponentParameters EMPTY>
<!ATTLIST FocalComponentParameters
    component_id CDATA #IMPLIED
    period_id CDATA #IMPLIED
    component_name CDATA #IMPLIED>
<!ELEMENT Consumption EMPTY>
<!ATTLIST Consumption
    period_id CDATA #REQUIRED
    product_id CDATA #REQUIRED
    product_name CDATA #IMPLIED
    component_id CDATA #REQUIRED
    component_name CDATA #IMPLIED
    driver_name CDATA #IMPLIED
    mix CDATA #REQUIRED
    quantity CDATA #REQUIRED>
<!ELEMENT ProductInteractions EMPTY>
<!ATTLIST ProductInteractions
    period_id CDATA #REQUIRED
    product1_id CDATA #REQUIRED
    product1_name CDATA #IMPLIED
    product2_id CDATA #REQUIRED
    product2_name CDATA #IMPLIED
    quant_assessment CDATA #REQUIRED
    qual_assessment CDATA #IMPLIED>
<!ELEMENT CalculationParameters EMPTY>
<!ATTLIST CalculationParameters
    allocation_policy (Uniform|Prioritized) "Uniform"
    opt_bus_problem CDATA #REQUIRED
    analysis_mode (Commit|Respond) "Commit"
    supply_constraint (On|Off) "Off"
    leadtime_constraint (On|Off) "Off"
    segment_switch (0|1) "1"
    confidence_level CDATA #IMPLIED>
```

APPENDIX B

```
<!ELEMENT Output (Error|(Plan?, ProductResults?, ComponentResults?,
    ComponentGatedProductResults?, ProductGatingComponentResults?,
    SensitivityGraphResults?, SensitivityTornadoResults?,
    AnalysisMetaResults?))>
<!ELEMENT Error (AnalyticError*)>
<!ELEMENT AnalyticError EMPTY>
<!ATTLIST AnalyticError
    message CDATA #REQUIRED>
<!ELEMENT AnalysisMetaResults (AnalysisMetaData+)>
<!ELEMENT AnalysisMetaData EMPTY>
<!ATTLIST AnalysisMetaData
    elapsed_time CDATA #REQUIRED>
<!ELEMENT Plan (ComponentLevel+)>
<!ELEMENT ComponentLevel EMPTY>
<!ATTLIST ComponentLevel
    component_name CDATA #REQUIRED
    period_id CDATA #IMPLIED
    component_id CDATA #IMPLIED
    status CDATA #IMPLIED
    level CDATA #REQUIRED>
<!ELEMENT ProductResults (ProductData+)>
<!ELEMENT ComponentResults (ComponentData+)>
<!ELEMENT ProductData EMPTY>
<!ATTLIST ProductData
    product_name CDATA #IMPLIED
```

APPENDIX B-continued

```
product_id CDATA #IMPLIED
period_id CDATA #IMPLIED
mean_demand CDATA #IMPLIED
availability_risk CDATA #IMPLIED
avg_fill_rate CDATA #IMPLIED
avg_shortage_depth CDATA #IMPLIED
expected_revenue_loss CDATA #IMPLIED
expected_margin_loss CDATA #IMPLIED
implied_support_level CDATA #IMPLIED
implied_support_level_conf CDATA #IMPLIED
product_support_percentile CDATA #IMPLIED
implied_product_support_percent CDATA #IMPLIED
expected_revenue CDATA #IMPLIED
expected_margin CDATA #IMPLIED>
<!ELEMENT ComponentData EMPTY>
<!ATTLIST ComponentData
component_name CDATA #IMPLIED
  component_id CDATA #IMPLIED
  period_id CDATA #IMPLIED
  plan_level CDATA #IMPLIED
  mean_demand CDATA #IMPLIED
  cancellation_cost CDATA #IMPLIED
  expected_erosion_cost CDATA #IMPLIED
  expediting_units CDATA #IMPLIED
  expediting_cost CDATA #IMPLIED
  flex_units CDATA #IMPLIED
  flex_pct CDATA #IMPLIED
  gating_risk CDATA #IMPLIED
  shortage_risk CDATA #IMPLIED
  avg_shortage_depth CDATA #IMPLIED
  avg_excess_depth CDATA #IMPLIED>
```

What is claimed is:

1. A computer-implemented method performed by a computer comprising:
receiving by the computer an input comprising:
a first set of data regarding available quantities of resources in a first planning period, where the resources are required to produce products,
a second set of data regarding available quantities of the resources in a second planning period,
a third set of data comprising one or more of:
a forecasted demand of the products on a period-by-period basis,
a revenue gained from satisfying demand for the products on a period-by-period basis, or
product availability targets for the products on a period-by-period basis and confidence levels of the product availability targets on a period-by-period basis, and
a fourth set of data comprising a relationship between each product and corresponding resources required to produce each product;
submitting by the computer the input to an analytic engine; and
receiving by the computer from the analytic engine an output comprising a risk indicator for the input.

2. The method of claim 1, wherein the risk indicator comprises a gating risk.

3. The method of claim 1, wherein the risk indicator comprises a cancellation cost.

4. The method of claim 1, wherein the submitting the input comprises mapping the input from a first language into a format understood by an engine core.

5. The method of claim 4, wherein the first language comprises an eXtensible Markup Language (XML).

6. A data storage medium having machine-readable code stored thereon, the machine-readable code comprising instructions executable by an array of logic elements, the instructions defining a method comprising:
receiving an input comprising:
a first set of data regarding available quantities of resources in a first planning period, where the resources are required to produce products,
a second set of data regarding available quantities of the resources in a second planning period,
a third set of data comprising one or more of:
a forecasted demand of the products on a period-by-period basis,
a revenue gained from satisfying demand for the products on a period-by-period basis, or
product availability targets for the products on a period-by-period basis and confidence levels of the product availability targets on a period-by-period basis, and
a fourth set of data comprising a relationship between each product and corresponding resources required to produce each product;
submitting the input to an analytic engine; and
receiving from the analytic engine an output comprising a risk indicator for the input.

7. The data storage medium of claim 6, wherein the risk indicator comprises a gating risk.

8. The data storage medium of claim 6, wherein the risk indicator comprises a cancellation cost.

9. The data storage medium of claim 6, wherein the submitting the input comprises mapping the input from a first language into a format understood by an engine core.

10. The data storage medium of claim 9, wherein the first language comprises an eXtensible Markup Language (XML).

11. A system comprising:
a memory storing machine-readable code comprising instructions that receive an input comprising:
a first set of data regarding available quantities of resources in a first planning period, where the resources are required to produce products,
a second set of data regarding available quantities of the resources in a second planning period,
a third set of data comprising one or more of:
a forecasted demand of the products on a period-by-period basis,
a revenue gained from satisfying demand for the products on a period-by-period basis, or
product availability targets for the products on a period-by-period basis and confidence levels of the product availability targets on a period-by-period basis, and
a fourth set of data comprising a relationship between each product and corresponding resources required to produce each product;
submit the input to an analytic engine; and
receive from the analytic engine an output comprising a risk indicator for the input; and
a processor for executing the machine-readable instructions stored in the memory.

12. The system of claim 11, wherein the risk indicator comprises a gating risk.

13. The system of claim 11, wherein the risk indicator comprises a cancellation cost.

14. The system of claim 11, wherein the submitting the input comprises mapping the input from a first language into a format understood by an engine core.

15. The system of claim 14, wherein the first language comprises an eXtensible Markup Language (XML).

* * * * *